United States Patent
Levitt et al.

(10) Patent No.: US 6,864,220 B2
(45) Date of Patent: Mar. 8, 2005

(54) COMPOSITION AND METHOD FOR ROAD-FILM REMOVAL

(75) Inventors: Mark D. Levitt, St. Paul, MN (US); Terry J. Klos, Victoria, MN (US); Michael E. Besse, Golden Valley, MN (US); Robert D. Hei, Baldwin, WI (US); Jerry D. Hoyt, Coon Rapids, MN (US); Cathleen O'Connor, Richfield, MN (US); Victor Fuk-Pong Man, St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 220 days.

(21) Appl. No.: 09/999,168

(22) Filed: Nov. 30, 2001

(65) Prior Publication Data

US 2002/0128169 A1 Sep. 12, 2002

Related U.S. Application Data

(60) Division of application No. 09/461,861, filed on Dec. 15, 1999, now Pat. No. 6,339,054, which is a continuation-in-part of application No. 09/295,035, filed on Apr. 20, 1999, now Pat. No. 6,350,725.

(51) Int. Cl.$^7$ .................... C11D 1/86; C11D 17/06; C11D 10/04
(52) U.S. Cl. .................. 510/424; 510/331; 510/324; 510/443; 510/500; 510/504
(58) Field of Search ................... 510/189, 241, 510/330, 495, 424, 331, 443, 500, 324, 504, 503, 356, 237, 515, 501, 433, 405, 406, 332, 327, 320, 276, 235, 329

(56) References Cited

U.S. PATENT DOCUMENTS

| | | |
|---|---|---|
| 2,992,108 A | 7/1961 | Knox et al. |
| 3,068,101 A | 12/1962 | Knox et al. |
| 3,123,640 A | 3/1964 | Longley |
| 3,141,905 A | 7/1964 | Longley |
| 3,165,409 A | 1/1965 | Knox et al. |
| 3,210,152 A | 10/1965 | van Helden et al. |
| 3,573,049 A | 3/1971 | Kalenda |
| 3,668,136 A | 6/1972 | Barker |
| 3,883,356 A | 5/1975 | Syrovatka et al. |
| 4,093,566 A | 6/1978 | MacNamara et al. |
| 4,153,571 A | 5/1979 | Garvin et al. |
| 4,284,435 A | 8/1981 | Fox |
| 4,336,165 A * | 6/1982 | Weisensel ............ 510/278 |
| 4,416,811 A * | 11/1983 | Wixon ................. 510/308 |
| 4,597,898 A | 7/1986 | Vander Meer |
| 4,664,848 A * | 5/1987 | Oh et al. ............. 510/350 |
| 4,741,842 A * | 5/1988 | Adams ................ 510/330 |
| 4,895,667 A | 1/1990 | Fox et al. |
| 5,013,622 A | 5/1991 | Simpson et al. |
| 5,156,837 A * | 10/1992 | Chaudhuri et al. .... 424/70.28 |
| 5,710,120 A | 1/1998 | Kaninen et al. |
| 5,827,542 A | 10/1998 | Miner et al. |
| 5,929,024 A | 7/1999 | Stringer et al. |
| 6,136,769 A | 10/2000 | Asano et al. |
| 6,339,054 B1 * | 1/2002 | Levitt et al. ......... 510/241 |
| 6,350,725 B1 * | 2/2002 | Levitt et al. ......... 510/189 |
| 6,602,350 B2 * | 8/2003 | Levitt et al. ......... 134/26 |

FOREIGN PATENT DOCUMENTS

| | | |
|---|---|---|
| EP | 0035381 A1 | 9/1981 |
| FR | 1497930 | 9/1967 |
| FR | 1556240 | 12/1968 |
| JP | 56061500 | 5/1981 |
| JP | 06205903 | 7/1994 |
| WO | WO 92/08823 | 5/1992 |

OTHER PUBLICATIONS

"Cationic Quaternary Ammonium Compounds EMCOL CC9 EMCOL CC-36 EMCOL CC-42", *Witco Chemical: Organics Division*, Bulletin 236 (May 1980).

"EMCOL CC-55" *Witco Chemical: Organics Division*, Bulletin (Sep. 1979).

"EMCOL CC-59" (Product Specification Sheet), *Witco Corporation: Oleochemicals/Surfactants Group* (051095).

Muller, W.H. et al., "Synthese der Athylester von NTA, ADTA, DTPA und Pyridin–2.6–Dicarbonsaure mit Hilfe von Pyrokohlensaurediathylester", *Archiv der Pharmazie*, 336–340 (1974).

"Nonionic and Ampholytic Surfactants", *Surface Active Agents and Detergents*, vol. 11, pp. 120–143 (1958).

* cited by examiner

Primary Examiner—Gregory Webb
(74) Attorney, Agent, or Firm—Merchant & Gould P.C.

(57) ABSTRACT

A concentrate and a ready-to-use or diluted formulation for an aqueous vehicle cleaner can remove a wide range of different types of traffic film using either low pressure application, hand pressure application, water jet spray apparatus, clean-in-place systems or other manual or mechanical washing systems. The compositions may comprise, for example, one or more solutions that each or collectively contain or comprises:

a) at least one anionic surfactant;

b) at least one poly[oxyalkylene] ammonium cationic surfactant; and c) an alkaline agent.

Optional additional ingredients may comprise at least one polycarboxylic acid chelating agent (preferably an aminocarboxylic acid chelating agent), at least one non-ionic or amphoteric surfactant, at least one hydrotrope, inorganic and/or organic acids and at least one silicate. The alkaline agent may provide a pH (when the finished product is diluted to 0.5 to 5% by weight in water) will be between about 9 to 13. The concentrate may be provided as a one-part or two part solution. Certain formulations have been found to be shelf stable as one-part concentrate or ready-to-use solutions, even with significantly different properties amongst the components. The compositions of the invention are also used in cleaning processes for surfaces, especially vehicle surfaces in car wash systems. The compositions are used in such processes where there are single or multiple liquid application steps.

27 Claims, No Drawings

COMPOSITION AND METHOD FOR ROAD-FILM REMOVAL

This application is a divisional patent application of U.S. patent application Ser. No. 09/461,861, filed Dec. 15, 1999 that issued as U.S. Pat. No. 6,339,054 on Jan. 15, 2002. U.S. patent application Ser. No. 09/461,861 is a Continuation-In-Part of U.S. patent application Ser. No. 09/295,035, filed Apr. 20, 1999 that issued as U.S. Pat. No. 6,350,725 on Feb. 26, 2002. U.S. patent application Ser. No. 09/461,861 and U.S. patent application Ser. No. 09/295,0351 are incorporated herein by reference.

BACKGROUND OF THE INVENTION

1. Field of the Invention

The present invention relates to compositions and method useful in the removal of road film and dirt from vehicles such as cars, trucks, motorcycles, snowmobiles, bicycles, vans, buses, trailers, railway trains and the like. These compositions and methods may be used manually, with hand operated cleaning equipment or in automatic cleaning equipment without the assistance of mechanical action. The methods of the invention may be practiced with a) low pressure, no contact cleaning methods, b) high pressure scrubbing application of the compositions, c) friction wash with low or high pressure fluid application, d) presoak cleaning in 'touchless' and friction-type vehical washes, e) clean-in-place (closed environment) washing systems, especially for aluminum, or any variation of cleaning formats known within the art.

2. Background of the Invention

It is desirable to keep the exposed surfaces of vehicles clean for reasons which include at least maintaining the appearance of the vehicle, minimizing surface tarnishing of the vehicle, reducing paint wear and fading, and preventing corrosion on the vehicle. Each of these adverse affects on vehicles are at least in part contributed to by materials which collect on the vehicle during use and storage. It is well known that regular surface care and washing of the vehicle can assist in maintaining the appearance of the vehicle and can even extend its useful life where corrosion damage is concerned. It is therefore desirable to have products available to the market place which can assist in the cleaning and washing of vehicle surfaces.

Unfortunately, the roadways are not uniform in the materials which contribute to the deposits left on vehicles. The composition of materials transferred from the roadways to cars (often along with moisture from the surface of the roadway) even changes with the seasons. The more obvious changes in the compositions of the road surface contaminants transferred to vehicles occur during the Winter, when anti-icing materials (e.g., salt, pumice, organic solvents such as ethylene glycol from anti-freeze solutions, sand) are regularly applied to the roadways. The salt used on roadways may often contain mineral oils or vegetable oils as an additive. Less obvious roadway contaminants may appear where agricultural materials used on fields in the Spring and Summer may run onto the road surfaces. Incompletely burned hydrocarbons, leaking vehicle fluids, and spills also contribute to the mix of road dirt which can be transferred onto vehicles. This vast variation in possible materials which may accumulate on cars is also complicated by the fact that soil compositions vary from region to region.

It is commercially undesirable to have to provide a vast array of cleaning solutions or concentrates from which cleaning solutions must be prepared which have to be chosen on the basis of the type of road-film which is thought to be present on a vehicle. The use or need for a wide range of different cleaning solutions would require increased work in designing, packaging and formulating specific cleaning compositions, and would require the user to select the appropriate cleaning solution for each particular vehicle to be cleaned. This would be a very undesirable situation. It is therefore important to attempt to provide cleaning solutions with the widest range of capability with respect to the removal of the most common types of road-film and dirt from vehicles. This is not any easy task because, as noted above, the components of the road-film might comprise organic materials, inorganic materials, hydrophilic materials, hydrophobic materials, acidic materials, or basic materials. It has therefore been a difficult task in designing cleansing compositions for the removal of road-film from vehicles which have a broad range of applicability for the different types of film which may be deposited on the vehicles.

Some mechanical action and/or aggressive fluid application pressure may be necessary in some application to remove traffic film. This can also complicate the compounding of the solutions as certain ingredients useful at lower pressure applications may cause foaming when used with stronger mechanical forces or higher pressure applications. If too high a fluid application pressure is used, the pressure can damage the surface without removing the traffic film. Prior cleaners remove some dirt but the traffic film was not completely removed. Additionally, attempts at providing cleaning solutions which are compatible with the cleaning of such significantly different soil compositions has encountered a problem wherein the ingredients of the proposed cleaning solutions are incompatible, either reacting with one another or separating during storage. The use of hydrofluoric acid solutions, although effective in cleaning certain clear metal surfaces, may be avoided where possible in commercial operations and requires careful control in industrial settings because of the corrosive strength of the HF.

U.S. Pat. No. 4,093,566 describes a phosphate-free spray cleaner for metals utilizing sodium metasilicates, sodium carbonate and EDTA dissolved in water with an ethoxylated wetting agent.

U.S. Pat. No. 4,153,571 describes a heat dependent alkali gel cleaning composition based on alkali metal hydroxides and various nonionic surfactants. Also, U.S. Pat. No. 4,099,985 describes the combination of sodium metasilicate, alkali metal hydroxide and non-ionic surfactants in an aqueous system for cleaning metal surfaces.

U.S. Pat. No. 4,284,435 describes a cleaning composition and method for removing road film from transportation vehicles without the necessity of mechanical brushing or wiping of the surface using high pressure spray equipment. The composition comprises 2 to 30% by weight of chelating agent; 1 to 12% by weight of a bis(ethoxylated) quaternary ammonium compound; 0.5% to 5% by weight ethoxylated alcohol nonionic surfactant; 0–5% by weight sodium metasilicate and water. This concentrate is diluted with water and applied to the surface at a pressure of above 400 psi. Among the chelating agents described are ethylenediamine tetraacetic acid (EDTA) and its salts and hydroxyethylenediamine triacetic acid (HEDTA) and its salts.

U.S. Pat. Nos. 3,123,640 and 3,141,905 describe cation-active surface active chemical compounds, the latter patent specifically describing their use for bactericidal, germicidal, antiseptic, algaecidal, fungicidal, textile softening, corrosion inhibition, antistatic, emulsifying, foam modifying, ore beneficiation, and various other purposes. The cation-active compounds are quaternary ammonium compounds derived from lower monoalkyl dialkanolamines. The cation-active compounds include a) dialiphatic, dialkoxylated quaternary ammonium compounds, and b) monoaliphatic, trialkoxylated quaternary ammonium compounds, as described by formulae in the patents.

One other significant problem with the design of washing solutions is the fact that where the cleaning product to be used in a wash is attempting to remove materials with different properties (e.g., water-soluble and oleophilic materials), the ingredients for the wash solution are likely to be incompatible. Therefore instability in the stored washing compositions and in the diluted wash solutions is highly likely. This instability may take the form of reactivity between ingredients and physical incompatibility between compounds which leads to separation of components or phases. These incompatibility effects can lead directly to reduced performance in the washing process and variability in the performance of the washing process.

BRIEF DESCRIPTION OF THE INVENTION

The present invention describes a concentrate and a ready-to-use or diluted formulation for an aqueous vehicle cleaner which can remove a wide range of different types of traffic film using either low pressure application, hand pressure application, water jet spray apparatus or other manual or mechanical washing systems. The compositions of the present invention may comprise, for example, one or more solutions that each or collectively contain or comprises:

a) at least one anionic surfactant. These anionic surfactants may be selected from the preferred group consisting of linear alkyl benzyl sulfonates, alpha olefin sulfonates, secondary alkane sulfonates and alkyl sulfates, or may be selected from a more general group consisting of linear alkyl benzyl sulfonates, alpha olefin sulfonates, secondary alkane sulfonates, alkyl sulfates, alkyl ether sulfates, phosphate esters, alkyl ethoxy carboxylates, sulfosuccinates, and soap (e.g., potassium cocoate);

b) at least one poly[oxyalkylene] ammonium cationic surfactant, and c) an alkaline agent.

Optional additional ingredients may comprise at least one polycarboxylic acid chelating agent (preferably an aminocarboxylic acid chelating agent), at least one non-ionic or amphoteric surfactant, at least one hydrotrope, and at least one silicate. The alkaline agent may provide a pH (when the finished product is diluted to 0.5 to 5% by weight in water) will be between about 9 to 13. The concentrate may be provided as a one-part or two part solution. Certain formulations have been found to be shelf stable as one-part concentrate or ready-to-use solutions, even with significantly different properties amongst the component. The compositions may optionally and preferably contain silicates such as metasilicates, orthosilicates (such as in the form of sodium or potassium metasilicate or sodium or potassium orthosilicate) or other materials to buffer or support the alkalinity of the solution up to about 1–2% by weight in the diluted solution, and to provide additional metal protection. The compositions of the invention are also used in cleaning processes for surfaces, especially vehicle surfaces in car wash systems. The compositions are used in such processes where there are multiple liquid application steps and where at least one of the liquid applications comprises at least one composition according to the present invention.

DETAILED DESCRIPTION OF THE INVENTION

The present invention relates to a cleaning product which may be provided in a concentrate, liquid, powder, solid or ready-to-use formulation, the product having a capability of cleaning a wide range of soil-film, dirt, oils, deposits and the like from vehicle surfaces with minimal damage to the surface of the vehicle, while using less aggressive materials than hydrofluoric acid. The invention comprises an aqueous solution, powder or solid (including the possibility of alcohol or other organic solvents present in combination with the water) with at least three active components therein. The at least three active components comprise at least one anionic surfactant, at least one alkoxylated ammonium cationic surfactant, and an alkaline agent to provide a pH (when diluted to 0.5 to 5% by weight total additives to water) which will be between about 8.0 (preferably at least 9) to 12. There are additional optional additives, some of which are preferred such as at least one polycarboxylic acid chelating agent (preferably an aminocarboxylic acid chelating agent), at least one non-ionic or Zwitterionic surfactant, and other additives defined herein. The compositions of the present invention may include those that comprise, for example, one or more solutions that each or collectively contain or comprises:

a) at least one anionic surfactant selected from the group consisting of linear alkyl benzyl sulfonates, alpha olefin sulfonates, alkyl sulfates, and secondary alkane sulfonates, b) at least one poly[oxyalkylene] ammonium cationic surfactant, and c) an alkaline agent, and d) a preferred optional ingredient, a chelating agent, particularly a chelating agent for monovalent, divalent and trivalent metal ions.

The present invention also comprises a process for the cleaning of a surface, especially a hard surface, more especially a painted hard surface, and most especially a painted vehicle surface (e.g., a car, truck bus, lorry, bicycle, van, mini-van, wagon, etc.). At least one of the composition(s) used in the cleaning of these surfaces comprises the defined alkoxylated (e.g., polyalkylene) ammonium cationic surfactant.

There are numerous different classes of vehicle and article cleaning formats that are known in the commercial and vehicle cleaning field of technology. The compositions of the present invention, particularly where metal surfaces (including painted or coated metal surfaces, as well as raw or anodized surfaces, such as aluminum) or composite surfaces are desired to be cleaned, and especially the exterior surfaces of vehicles are to be cleaned, are particularly effective and beneficial. General areas of use for these materials and processes include, but are not intended to be literally limited to presoak washes, preliminary washes, substantive washes, post washes, and rinses used in vehicle washes (including 'touchless,' low pressure, intermediate pressure, high pressure, friction-assisted, and friction washes), apparatus and utensil washes, wheel and rim cleaning washes in automated and/or manual systems, undercarriage washes, special carbon-soil film removal (for vehicles, especially for cars, trucks, motorcycles, trains, and off-road vehicles such as ATV's and snow-mobiles), and rust or stain removal (especially as used in truck washing). The cleaning environment may include outside (uneneclosed) wash systems, housed (enclosed) wash units, transient wash systems (e.g., where the vehicles move in assembly-line, conveyed fashion through the system, or clean-in-place systems where the vehicle, device or apparatus is placed into a closed environment and the cleaning steps are performed on the vehicle device or apparatus while it is confined within the environment. In the clean-in-place systems, the various cleaning solutions may be used once before discarding, be partially recycled (mixed with refreshing solution and partially recycled), or be completely recycled, until they are determined to be spent. The spent or partially spent waste liquids may be reclaimed for separation of components or discarded in an environmentally acceptable manner.

The alkoxylated cationic ammonium cationic surfactant is an ingredient of particular note within the practice of the present invention. These cationic surfactants are commercially available, for example, as Witco Chemicals Cationic quaternary ammonium compounds Emcol CC-9, Emcol CC-36, and Emcol CC-42. A preferred compound is commercially provided as GLENSURF™ 42, which is inaccurately described as "Diethylammonium Chloride" in a PRODUCT DATA SHEET provided by Glenn Corporation, which sells the product. The CAS Number for the actual compound is 68132-96-7, its Chemical Abstract name is Poly[oxy(methy-1,2-ethanediyl)], alpha-[2-diethylmethylammonio)ethyl]-omega-hydroxy chloride, and its chemical formula is listed as $(C_3H_6O)_n C_7H_{18}NO).Cl$. The alkoxylated ammonium cationic surfactants used in the present invention may be generally defined according to the formula:

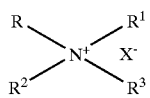

wherein R, $R^1$ and $R^2$ are independently selected from lower alkyl groups (C1–C4 alkyl groups), R3 comprises a polyoxyalkylene chain, and X comprises an anion (any anion is useful, acid anions preferred, such as chloride, iodide, bromide, fluoride, acetate, phosphate, sulfate, etc.). A preferred type of polyoxyalkylene chain (also referred to as a poly[oxyalkylene] chain) would have the general formula:

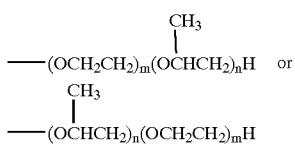

wherein m is from 0 to 30, n is from 1 to 60, and m plus n is from 1 to 60, and n>m. It is preferred that the ratio of n/m is at least 2, more preferred that n/m is at least 4, and still more preferred that n/m is greater than 5 or even that m=0. It is also preferred that m+n is within the range of 5 to 60, still more preferred that m+n is within the range of 8 to 50, the most preferred being where m=0 and n=35–45 (e.g., 42). The anion is fairly inert in the system except for its solubility characteristics, which are well understood in the art. Simple anions, especially simple or lower molecular weight acid anions such as chloride, bromide, iodide, sulfate, paratoluene sulfonate, acetate, nitrate, nitrite, phosphate, and the like are conveniently selected as the counterion ion in the cationic surfactant. It is an option that the total number of carbon atoms among R, $R^1$ and $R^2$ have a combined number of fewer than 12 carbon atoms (with the possible maximum being 12 carbon atoms). It is an additional option that the total number of carbon atoms in the R, $R^1$ and $R^2$ groups are between 3 and 12 carbon atoms or between 4 and 8 carbon atoms. The most common form of this class of surfactants has R, $R^1$ and $R^2$ as one methyl radical and two ethyl radicals. In describing compounds by structure and formula in the practice of the present invention, it is well understood that substitution of the compounds would be practiced within the background skill of one ordinarily skilled in the art. The ability of these cationic surfactants has been clearly found to be superior to the performance of other cationic surfactants. Some of the other quaternary cationic surfactants have been found to make certain components of road soil more persistent on the surface to be cleaned or even attract certain types of soil contaminants, as compared to the poly[oxyalkylene] ammonium cationic surfactants defined for use in the practice of the present invention. These poly[oxyalkylene] ammonium cationic surfactants (by themselves, but with regard to some of the following characteristics, particularly in combination with other components of this invention) contribute to at least five fundamental beneficial characteristics of the systems of the present invention which are: 1) compatibility with the anionic surfactant (even those that are generally incompatible with commonly used cationic surfactants, 2) improved overall cleaning performance as compared to compositions which are otherwise identical except for the presence of these poly[oxyalkylene] ammonium cationic surfactants, 3) enhanced drying performance in combination with any or all of the remaining components of the compositions, 4) reduced detrimental surface appearance or no detrimental surface appearance (even though the evidence is clear that the compositions of the present invention are persistent and leave material on the washed surface, especially as evidenced by the persistent improved drying rate of the surface after treatment, the appearance of the surface is quite good, with good reflectivity, no dulling or matte-like appearance, and no discoloration), and 5) a substantive appearance to the finish (the solution actually can improve the appearance of the finish, providing good reflectivity, and a polished appearance to the surface). These combinations of properties are best obtained by the use of these polyoxyalkylene ammonium cationic surfactants, especially in combination with the rest of the components described above for use in the present invention.

These compounds are described in U.S. Pat. Nos. 3,123, 640 and 3,141,905 as cation-active surface active chemical compounds. The cation-active compounds are quaternary ammonium compounds derived from lower monoalkyl dialkanolamines. The cation-active compounds also include a) dialiphatic, dialkoxylated quaternary ammonium compounds, and b) monoaliphatic, trialkoxylated quaternary ammonium compounds, as described by formulae in the patents, and are useful in the practice of the invention as the polyoxyalkylene ammonium cationic surfactants. Those patents are incorporated herein by reference for the disclosure of the structure of those classes of compounds.

In the description of chemical structures and formulae, where the term "group" is used, that terminology is specifically intended to reflect the ability of one ordinarily skilled in the art to use substituted or unsubstituted materials from within the defined class. With regard to the specific example of "alkyl group," that term would reflect and is intended to cover not only hydrocarbons which literally fit within the definition of alkyl (e.g., methyl, ethyl, propyl, hexyl, cyclohexyl, isooctyl, dodecyl, stearyl and the like), but also those types of substituted alkyl compounds which one of ordinary skill in the art would select for minor or specifically intended variations in the physical and/or chemical properties effected by the substitution such as chloromethyl, hydroxy-ethyl, ethylene sulfonate, 4-cyanobutyl, ethylene-ethyl ether (—CH$_2$CH$_2$OCH$_2$CH$_3$), ethylene-ethyl thioether, dodecyl carboxylate (and its ester), 3,4-dibromobutyl, and the like. Where the term "alkyl moiety" is used, that term encompasses only unsubstituted alkyl. Similarly, the term a "compound having the central nucleus" refers to all chemical compounds which have the identified chemical structure defined for the nucleus, with the option of having substitution thereon which does not alter the bond structure defined in the formula. For example, a central structure of the formula:

would include, phenyl, para-hydroxy phenyl, 1,3-dichlorophenyl, 2,4,6-trimethylphenyl, naphthyl, benzamidazol (attached through the benzyl ring), and the like, but would not include cyclohexane, piperidine, or the like, as those changes alter the bond structure of the ring. The terminology of a ring or substituent of the formula limits the structure to the specific groups and positions for substitution as shown.

Anionic surfactants are materials well known in the cleaning, detergent, and general materials composition art. A surfactant is generally defined as any compound which when added to water or an aqueous solution increases the spreading or wetting properties of water or the aqueous solution, usually as measured by reducing the surface tension of the liquid. Surfactants often comprise two segments, one segment which is hydrophilic and another which is hydrophobic. Where the segment of the surfactant which is most active in reducing the surface tension of the water contains or comprises an anion (e.g., dodecylbenzenesulfonate), the surfactant is referred to in the art as an anionic surfactant. Where the most active segment is cationic, the surfactant is referred to as a cationic surfactant, and where the most active portion is non-ionic or amphoteric (having both anionic and cationic species), the surfactant is referred to as a non-ionic or amphoteric surfactant, respectively. The anionic surfactant is generally used in an amount which would provide from about $1\times10^{-5}$ to 3% by weight (preferably about $1\times10^{-3}$ to 1% by weight) of the applied solution (the diluted solution or ready-to-use solution). Where the concentrate may be diluted from 1 to twenty or more times, the concentration of the anionic surfactant in the concentrate may be, for example, about $1\times10^{-2}$ to 20% by weight of the concentrate solution.

Examples of anionic surfactants include organic carboxylates, organic sulfonates, organic sulfates, organic phosphates and the like, particularly linear alkylaryl sulfonates, such as alkylarylcarboxylates, alkylarylsulfonates, alkylarylphosphates, and the like. It has been found that only certain anionic surfactants maximize the benefits of the present invention. These classes of anionic surfactants are known within the surfactant art as linear alkyl benzyl sulfonates (LABS), alpha olefin sulfonates (AOS), alkyl sulfates, and secondary alkane sulfonates. These are art recognized classes well understood by the ordinary surfactant chemist.

The preferred chelating agents for metal ions include polycarboxylic acid chelating agents include such natural occurring materials as citric acid and malic acid (and their equivalents) and such conventional synthetic materials such as the aminocarboxylic acid or amine-type carboxylic acid or amine-type acetic acid chelating agents such as ethylene-diaminetetraacetic acid (EDTA), diethylenetriaminepentaacetic acid (DTPA), hydroxyethylenediaminetriacetc acid (HEDTA), and the many other chelating carboxylic acids known in the art. A good background on the structure and types of the chelating amine-type carboxylic acids is provided in U.S. Pat. No. 5,013,622 and Archiv der Pharmazie 307(5), pp. 336–340, 1974. The chelating carboxylic acid is generally used in a amount of from about $1\times10^{-3}$ to 2% by weight of the applied solution (the diluted solution or ready-to-use solution). Where the concentrate may be diluted from 1 to twenty or more times, the concentration of the chelating acid in the concentrate may be, for example, about $2\times10^{-3}$ to 50% by weight of the concentrate solution. The chelating acids are often provided as metal salts, especially sodium or potassium salts of the acids, such as trisodium hydroxyethylenediaminetriacetate. Amino phosphonates are also suitable for use as chelating agents in the compositions of the invention, and include aminotris (methylene phosphonate) (ATMP), ethylenediaminetetra (methylenephosphonates) (EDTMPA), diethylenetriamine-N,N,N',N'',N''-penta(methylene phosphonate) (DETPMP) and 1-hydroxyethane-1,1-diphosphonate (HEDP). Preferably, these amino phosphonates do not contain alkyl or alkenyl groups with more than about 6 carbon atoms.

Non-ionic and amphoteric surfactants are also well known in the art. Many of these may contain polyoxyalkylene chains within the molecule, with appropriate end groups altering the hydrophilic/hydrophobic balance of the compound. The oxylakylene component is often selected from oxypropylene (CH$_2$ CH$_2$ CH$_2$—O—) or oxyethylene (CH$_2$ CH$_2$—O—) linkages, preferably with the majority or entirety of the groups in the oxyalkylene chain being oxyethylene linkages. More specific known classes of these non-ionic surfactants are known in the literature as non-ionic alkoxylates, non-ionic alkylphenol polyethers, alcohol alkoxylates (e.g., specifically alcohol ethoxylates and alcohol propoxylates and mixed ethoxylates/propoxylates), non-ionic condensates of branched chain primary or secondary alcohols and alkylene (especially ethylene) oxides, alkoxylated amines, amine oxides, non-ionic condensates of fatty acids and alkylene oxides, and the like. Examples of such nonionic surfactants are found in "Surface Active Agents and Detergents," Volumes I and II, Interscience Publications and U.S. Pat. Nos. 2,992,108; 3,068,101; 3,210,152; 3,165, 409; and French Patent Nos. 1,556,240 and 1,497,930. Amphoteric surfactants are also well known in the literature and include, merely as examples thereof, betaines (such as amidoalkyl betaines), and the like. Examples of such compounds are found in U.S. Pat. No. 3,573,049. The non-ionic surfactant is generally used in a amount which would provide from about $1\times10^{-5}$ to 3% by weight (preferably about $1\times10^{-4}$ to 1% by weight) of the applied solution (the diluted solution or ready-to-use solution). Where the concentrate may be diluted from 1 to twenty or more times, the concentration of the non-ionic surfactant in the concentrate may be, for example, about $1\times10^{-2}$ to 90% by weight of the concentrate solution. Dehypon™ LS-54 having (a C$_{12-14}$, Ethylene Oxide (EO) Propylene Oxide (PO), with distributions of about (EO)$_5$-(PO)$_4$) has been found to be particularly beneficial, as has Videt RFG (roughly determined to be an estimated C$_{12-15}$, Ethylene Oxide (EO), with about (EO)$_9$ and possibly a phosphate ester grouping). The Dehypon™ LS-54, in combination with cationic surfactants in the present invention, particularly the polyoxyalkylene ammonium cationic surfactants such as the GlenSurf 42 (described above) has been found to provided a significant and unexpectedly enhanced effect in the overall performance of carrying the detergent action to the surface, particularly through road film. Videt RFG would be a less desirable alternative to the Dehypon™ LS-54.

The alkaline agent to provide a pH (when diluted to 0.25 to 5% by weight total additives to water) which will be between about 8 to 13 may comprise any of the many alkaline agents known in the art, but preferably comprises metal phosphates, metal carbonates, and metal hydroxides, particularly alkali or alkaline metal hydroxides such as NaOH and KOH. The weight percentage of the pH control agent depends upon the strength of the agent and the target goal for the pH. Generally the pH control agent may be used in weight percentages of about $1 \times 10^{-5}$% to 1%, 2% or even 3% by weight of the dilute solution, preferably from $1 \times 10^{-5}$ to 3%, and more preferably from $5 \times 10^{-5}$% to 1.5% or 2.5% by weight of the diluted solution to deliver a pH of from about 8.5 to 13, preferably from 8.5 to 12. This would convert to about 0.2 to 20% by weight pH agent of the concentrate.

Other conventional and non-conventional cleaning solution additives may be added in the practice of the present invention. Where shelf stability of the cleaning product (as a concentrate or as a ready-to-use product) is important, the optional additives should not react with other ingredients to change the performance of the system adversely or cause components to precipitate or separate within the solution. Among specific types of materials which may be optionally added into the system include, but are not limited to quaternary ammonium compounds, fragrances, brightening agents, antifoaming agents, foaming agents, wetting agents, antioxidants, stabilizers, coupling agents, emulsifying agents, solvents and the like. Silicates, such as metasilicates and orthosilicates are a preferred additive and may be provided in a weight percentage of the diluted solution of from about $1 \times 10^{-5}$ to 1% or more by weight, preferably from about $5 \times 10^{-4}$ to 1%, and more preferably from about $1 \times 10^{-3}$ to 1% by weight of the diluted solution. This would convert to about $5 \times 10^{-5}$ to 25% by weight of the concentrate solution. The balance of the solution would primarily be water, with other optional ingredients also present.

The above composition is usually provided as a concentrate designed to be diluted with water. The ratio of concentrate to water is within the range of from about 1:300 to 1:10, but may be diluted to any proportion within that range or less efficiently diluted by a lesser amount (e.g., 1:2). The present invention is able to provide an efficient cleaning composition especially adapted to remove road film which may have a wide range of components from transportation vehicle surfaces. The cleaner may effectively remove traffic film without damaging painted surfaces.

The composition of the present invention also includes an ethoxylated primary or secondary alcohol having from 8 to 18 carbon atoms reacted with from 2 to 12 moles of ethylene oxide. It is preferred that the nonionic have from 3 to 8 moles of ethylene oxide, with the optimum being about 7 moles. These nonionic surfactants are difficultly soluble in the concentrate. Therefore the minimum amount which will provide the proper wetting characteristics is preferred.

These materials are commercially available and well-known nonionic surfactants. The following materials are particularly preferred: lauryl alcohol ethoxylated with 3 moles of ethylene oxide (EO), coco alcohol ethoxylated with 3 moles EO, stearyl alcohol ethoxylated with 5 moles EO, mixed $C_{12}$–$C_{15}$ alcohol ethoxylated with 7 moles EO, mixed secondary $C_{11}$–$C_{15}$ alcohol ethoxylated with 7 moles EO, mixed $C_9$–$C_{11}$ linear alcohol ethoxylated with 6 moles EO and the like. It is preferred that the nonionic have from 8 to 15 carbon atoms in the alkyl group. When this preferred alkyl group is used the most preferred nonionic is the mixed $C_{12}$–$C_{15}$ alcohol ethoxylated with 7 moles EO. A preferred material comprises the alcohol alkoxylates, particularly the alcohol ethoxylates and propoxylates, especially the mixed ethoxylates and propoxylates, particularly with 3–7 oxyethylene (EO) units and 3–7 oxypropylene (PO) units such as the alcohol Dehypon™, having 5 EO units and 4 PO units. These materials may be present in a wide range of concentrations, such as, for example, from 0.1 to 25% by weight of the concentrate or solution, from 1 to 25% by weight of the concentrate or solution, 1 to 20% by weight of the concentrate or solution, 2 to 15% by weight of the concentrate or solution, or 4 to 12% by weight of the concentrate or solution.

Compositions within the scope of the present invention may also include the presence of an alkyl dimethyl amine oxide. A preferred amine oxide is lauryldimethyl amine oxide.

The concentrate of the present invention could be an aqueous composition. The balance of the composition is essentially water. No particular provisions with regard to non-deionized or distilled water is required.

The composition of the present invention is useful in cleaning vehicle surfaces by any type of pressure spraying or non-pressure application with an aqueous solution or a water concentrate mixture having a temperature of as low as 1° C., although higher temperature water up to 95° C. can be utilized. Generally, it has been found that water having a temperature of from 20° C. to 60° C., is preferred, with water having a temperature of from 40° C. to 50° C., being most preferred. It is within these preferable ranges that an energy savings results as hot water need not be utilized to clean the vehicles.

The composition in the present invention can be either pre-diluted before being introduced to the pressure spray apparatus, or can be mixed in situ during spraying. Generally from 1 part concentrate mixed with 300 to 50 parts water will provide the most effective cleaning. The exact amount depends on the water hardness, the type of soil in the traffic film, the concentration of actives in the concentrate and the like, i.e., with harder water, a more concentrated solution must be used. Also with soils containing particular metals, a higher concentration is desirable for most effective cleaning. Nevertheless, satisfactory results can be obtained using dilutions within the above range although 1:300 to 1:50 is most preferred.

The processes used in the cleaning industry, such as industrial cleaning, spray washing, mechanical washing, vehicle washing (both automatic and hand-washing, no-touch or mechanical, low pressure, moderate pressure or high pressure), utensil or machine part washing, and the like is usually performed in a number of steps used in sequence and in various combinations. It is not unusual for five or more liquid applications to be applied during a complete wash cycle. For example, there may be a first preparatory application (prep wash, prep gun, presoak, prep rinse or pre-rinse) which comprises, for example, only water; water and detergent; water and builder (e.g., phosphate); water, detergent and builder; and these solutions with surfactants therein. There may also be as a second (or first) step a presoak (or soak, or full soak), even after the prep rinse. This application often comprises the major application of detergent/surfactant in aqueous solution (and some or all optional materials such as chelating agents, solvents, etc.), although non-aqueous, organic solutions may be used. The third possible step (or first or second step) that might be used comprises a main wash application, which usually would follow the pretreatment(s) of either the prep rinse and/or soak application, with little or no time delay between steps, although minutes may often pass between steps, even though this is not preferred from a time usage standpoint or wetting standpoint of the solutions and treatments. The main wash may contain most or all of the primary active agents and the optional agents as desired for the specific process and as listed above. Another application (e.g., a possible fourth step) in this sequence may be a "clear coat" application, often comprising a non-ionic surfactant, anionic surfactant, optional quaternary compound, buffering agent or pH control agent, solvent, and the like. Any of these steps or combinations of steps may then be followed by a possible fifth step such as a rinse step, with the application comprising water (alone), some lower concentration or solvents and detergents than in one or more of the previous applications, and generally lower concentrations of additives. Another optional step (e.g., a possible sixth step) would be a drying application step which might include an organic, relatively non-volatile solvent (e.g., mineral seal oil, C1–C6 ester, etc.), water, alkyl or aryl quaternary ammonium compound, dialkyl quaternary ammonium compound and any of the other optional ingredients. A main purpose of this application is to facilitate removal (e.g., physical removal, as by run-off or air spray assisted run-off) of the liquid from the surface so that spotting from dissolved or carried components is reduced. This more rapid drying is particularly significant since the potential for residue remaining is lessened and the total time of the wash cycle may be reduced by reduction in the critical drying phase at the end of the wash cycle. The solutions may also be used in clean-in-place systems as well as conveyor wash systems or free-standing/open systems.

The use of the defined cationic surfactant (comprising a solution of poly[oxyalkylene] ammonium cationic surfactant alone in a water carrier, a solution with water and any surfactant, or in a solution [aqueous or organic] in combination with at least one of the three classes of anionic surfactants, the linear alkyl benzyl sulfonates (LABS), alpha olefin sulfonates (AOS), and secondary alkane sulfonates, e.g., in an aqueous solution having a pH of at least 8.5 (e.g., between 8.5 and 13, between 8.5 and less than 11.5, or between 8.5 and 10.5) into any one of the first five steps described above, particularly the prep rinse, soak, main wash, rinse and clear coat applications can improve the driability of the washed structure. This is particularly true when the combination of anionic and cationic surfactant is added before or during the main wash. It has also been noted that the addition of the defined class of poly[oxyalkylene] ammonium cationic surfactant to the prep rinse and/or the soak, without the addition of the anionic surfactant species improves driability of the cleaned and washed surface.

The practice of certain aspects of the present invention has been found to provide uniquely beneficial effects in certain specific washing sequences, even where there are already general benefits provided in all washing, rinsing, or cleaning situations. The alkoxylated cationic ammonium cationic surfactant has been found to provide a particularly unique effect in the washing/rinsing/cleaning/waxing/drying cycles encountered in the washing of vehicle surfaces. When the alkoxylated ammonium cationic surfactant is present in an effective amount (e.g., greater than 5 parts per million (ppm)) in at least one of a series of liquid application steps in a washing/rinsing/cleaning/waxing/drying sequence, and the application is in any step before drying, the liquid is removed from the washed surface more rapidly (by sheeting, shedding, or physical movement of the liquid rather than evaporation) than with other compositions, and in some cases more completely before active drying (by towels or heated air or air drying). This feature is uniquely beneficial in the surface cleaning industry, and especially the vehicle cleaning industry. As vehicles are washed, cleaned, rinsed and then usually air dried or blown dried. The first method of drying allows for the formation of drying spots or water spots on the surface, if all of the liquid with any solids content has not been removed from the surface before air drying. The same problem occurs to a lesser extent with the blow drying (whether heated or not), and the time and energy involved in extended forced drying is reduced when there is less liquid remaining on the surface at the beginning of forced drying process.

In addition, there is a less quantifiable, but definitely observable benefit in the use of the poly[oxyalkylene] ammonium cationic surfactants in wash applications, particularly to car and vehicle bodies during wash operations. There is a visible improvement in the 'shine' or shininess of the surface when the poly[oxyalkylene] ammonium cationic surfactant is present in wash compositions than in similar wash compositions tried. This is believed to be a result of the fact that fewer adverse, shine reducing materials remain on the surface either from the original road film (remaining on the surface or redepositing on the surface from solution that is not removed) and/or from materials in the wash solution which deposit on the surface.

The exact functional mechanism by which the alkoxylated ammonium cationic surfactant affects the drying cycle in a washing/rinsing/cleaning/waxing/drying is not understood. This renders it all the more surprising that an unknown phenomenon is occurring in the application of the alkoxylated ammonium cationic surfactant that provides this unexpected benefit.

Examples of washing compositions include:

I. A washing composition used as an aqueous solution at a pH between about 1.0 or 2.0 to about 13 comprising:
 a) at least one anionic surfactant selected from the group consisting of linear alkyl benzyl sulfonates, alpha olefin sulfonates, and secondary alkane sulfonates, and
 b) at least one poly[oxyalkylene] ammonium cationic surfactant, The use of this particular washing solution (as applied solutions 1a) then 1b) at a pH between 1.0 and 6.0, with the addition of acidulating (or acidifying) agents, has been found to be particularly and surprisingly effective in areas where the water source has high water hardness and high TDS.

II. A washing solution used at a pH between 8.5 and 13 comprising:
 a) at least one anionic surfactant selected from the group consisting of linear alkyl benzyl sulfonates, alpha olefin sulfonates, alkyl sulfates, and secondary alkane sulfonates,
 b) at least one poly[oxyalkylene] ammonium cationic surfactant, and
 c) an alkaline agent.

III. Another useful washing composition that is used at a pH between 8.5 and 10.3 comprises:
 a) at least one anionic surfactant selected from the group consisting of linear alkyl benzyl sulfonates, alpha olefin sulfonates, alkyl sulfates, and secondary alkane sulfonates, and
 b) at least one poly[oxyalkylene] ammonium cationic surfactant,
 c) an alkaline agent, and
 d) a chelating agent.

Each of the washing compositions of I, II and III may also be combined with non-ionic surfactants, particularly polyoxyalkylene non-ionic surfactants such as the Dehypon™ LS-54 and Videt RFG described above to provide enhanced performance. A total addition weight of from 1 to 25% or from 2–20%, or from 3–15% or from 5–10% by weight of the concentrate or non-aqueous components of the solutions would be a generally useful range. The concentrations for the concentrates would be in solutions diluted, for example, about 5–300 or 75–100 times. Each class of washing solution operates particularly well within and around the respectively described pH levels at the substrate surface. These pH levels would tend to be slightly higher in either a diluted solution or concentrate (e.g., 0.1 to 0.7 or more pH units higher) as compared to the pH on the surface of a vehicle to which the solutions were applied after application of an acid prewash. It has been surprisingly found that where the pH of the diluted solution (introduced as either a single step composition application or various solutions applied in multiple steps) while on the surface being cleaned (i.e., over at least a portion of its dwell time on the surface) is between about 8.5 to 11.0 or between about 9.0 and 10.5 (e.g., a surface contact pH between 8.5 and less than 11.5 or between 8.5 or 9.0 and 10.3 or 11.0), the general cleaning activity of the wash solution is significantly enhanced and even visually observable improvements in cleaning can be provided. The concentration of the alkoxylated ammonium cationic surfactant can be varied over a wide range, and the variations have been shown to have significant effects dependent upon which solutions are being used. Although the alkoxylated ammonium cationic surfactant may be used in concentrations of from about 3 to 2,500 parts per million in the diluted or use solutions, they are more desirably provided in amounts of from 5 to 2,000, or 10 to 1,800 ppm in solutions applied with a chelating agent or after application of the chelating agent. The higher levels of the alkoxylated ammonium cationic surfactant may be particularly beneficial in waxing or polish liquids, the alkoxylated cationic ammonium cationic surfactant acting to provide a significantly and observably better shine when applied in these compositions during the wash cycle. The amounts of the alkoxylated ammonium cationic surfactant applied in these polish or wax compositions may be better provided in the higher end of the concentrations, from 10–1000, from 50–1000, or from 50–500 ppm. in the particular composition.

The lower levels of the alkoxylated ammonium cationic surfactant may be desirable in the earlier applied compositions, especially any preparatory or prescrub liquid compositions, but this may be in part dependent upon the specific type of road soil encountered. For some types of road soil, it has been found that larger amounts of the alkoxylated ammonium cationic surfactant may reduce the ability of a specific component of the soil from being removed, while the lower concentration still actively assists in the removal of that specific component. In all concentrations of alkoxylated ammonium cationic surfactant, however, the compositions of the invention still actively clean surfaces in an advantageous manner.

The compositions of the present invention and wash sequences using compositions of the present invention wherein at least one liquid applied during the wash cycle comprises at least 5 ppm of at least one alkoxylated ammonium cationic surfactant have also been observed in some specific events to provide a unique benefit in cleaning vehicle surfaces at lower temperatures. It is known in the industry that when vehicles are washed at lower temperatures (e.g., below 60° F., below 50° F., below 40° F. or below 30° F., that is below 18° C., below 13° C., below 4° C. or below −1° C.), the road soil tends to be harder to remove. It is not fully understood whether this is caused by reduced activity of wash components because of the reduced temperature, or other phenomenon, but the poorer cleaning results are apparent. It has been found in the practice of the present invention that when one or more of the wash solutions of the present invention are applied to vehicles wherein the body temperature of the vehicle and/or the air temperature of application are at lower temperatures (as defined above), the washing cycle provides for a better cleaning than other wash systems. As the use of the alkoxylated cationic ammonium cationic surfactants are novel in vehicle wash systems and this benefit is unexpected from any teachings of the prior art, the process comprising the following steps is also novel and unobvious. The process comprises:

A process for cleaning the exterior surfaces of a vehicle comprising applying a first liquid to the exterior surfaces of a vehicle and then applying a second liquid to the surface of the vehicle, at least one of said liquids comprising at least 5 ppm of at least one poly[oxyalkylene] ammonium cationic surfactant, wherein the temperature of the surface of the vehicle is less than 60° F. (below 18° C.) and/or the air temperature and/or solution temperature at which the at least one of said liquids comprising at least one poly [oxyalkylene] ammonium cationic surfactant is below 60° F. (below 18° C.). The process may also be characterized as a process for cleaning the exterior surfaces of a vehicle comprising applying a first liquid to the exterior surfaces of a vehicle and then applying a second liquid to the surface of the vehicle, at least one of said liquids comprising at least 5 ppm of at least one poly[oxyalkylene] ammonium cationic surfactant, for where at least one liquid comprises an aqueous solution at a pH between 8.5 and 13 comprising:

a) at least one anionic surfactant selected from the group consisting of linear alkyl benzyl sulfonates, alpha olefin sulfonates, and secondary alkane sulfonates, b) at least one poly[oxyalkylene] ammonium cationic surfactant, and c) an alkaline agent;

wherein the temperature of the surface of the vehicle and/or the air temperature and/or solution temperature is at or below said lower temperature (e.g., below 60° F., e.g., below about 18° C.).

At least one of the liquids applied with or after or before the application of the at least one poly[oxyalkylene] ammonium cationic surfactant may comprise a chelant (as defined and described hereinabove) or the first application of the at least one poly[oxyalkylene] ammonium cationic surfactant may include a chelant, it being within the scope of the invention to apply a chelant before application of the at least one poly[oxyalkylene] ammonium cationic surfactant. It is also desirable in one practice of the present invention, particularly where certain types of road soil may be present on the vehicle to include a nonionic surfactant, as described above with at least one of the liquids applied. The nonionic surfactant may in fact be beneficially combined into a liquid comprising both the anionic and the at least one poly [oxyalkylene] ammonium cationic surfactant. The three different classes of surfactant and the chelant may therefore be applied in a single liquid composition. A particularly useful class of non-ionic surfactants that have never been used in vehicle wash compositions before include the class defined as alkoxylated amines or, most particularly, alcohol alkoxylated/aminated/alkoxylated surfactants. These nonionic surfactants may be at least in part represented by the general formulae:

$$R^{20}\text{-(PO)}_s\text{N-(EO)}_tH, R^{20}\text{-(PO)}_s\text{N-(EO)}_tH(EO)_uH \text{ and}$$

$$R^{20}\text{—N(EO)}_tH,$$

wherein $R^{20}$— is an alkyl, alkenyl or other aliphatic group, or an alkyl-aryl group of from 8 to 20, preferably 12 to 14 carbon atoms, EO is oxyethylene (as previously defined), PO is oxypropylene as previously defined, s is 1 to 20, preferably 2–5, t is 1–10, preferably 2–5, and u is 1–10, preferably 2–5. Other variations on the scope of these compounds may be represented by the alternative formula:

$$R^{20}\text{-(PO)}_v\text{-N[(EO)}_wH][(EO)_zH]$$

wherein $R^{20}$ is as defined above, v is 1 to 20 (e.g., 1, 2, 3, or 4 [preferably 2]), and w and z are independently 1–10 and preferably 2–5.

These compounds are represented commercially by a line of products sold by Huntsman Chemicals as nonionic surfactants. A preferred chemical of this class includes Surfonic™ PEA 25 Amine Alkoxylate. It has been found, not only within the compositions of the present invention, but alone, in aqueous solutions, organic solutions, and mixtures with other surfactants (anionic, cationic, non-ionic, amphoteric, Zwitterionic), basic solutions, or acidic solutions that these alcohol alkoxylated/aminated/alkoxylated surfactants of this class are particularly effective in the removal of hydrophobic materials, particularly highly hydrophobic materials including grease, oils, greasy materials, and/or oily materials which may appear in soils, even though these individual materials may have very different physical or chemical natures. Examples of the hydrophobic materials or components of road soil that have been specifically identified as being cleanable by this class of materials includes, for example only, triglycerides, cable grease (e.g., Del Ray Cable grease based on fatty ester), fatty esters, divalent fatty acid salts, Mo (probably $MoS_2$ or $MoSi_2$), and Sb; and other highly hydrophobic greases with high temperature melting characteristics.

Another variation within the practice of the present invention is the use of an acidic presoak liquid or prescrub liquid, before, after or at the same time as the application of the liquid compositions comprising the at least one poly[oxyalkylene] ammonium cationic surfactant, such as the liquid comprising the aqueous solution at a pH between 8.0 and 13 or between 8.5 and less than 12.0 or less than 11.5 (with a chelating agent present) or between 8.5 and 10.5 (with a chelating agent present) comprising:

a) at least one anionic surfactant selected from the group consisting of linear alkyl benzyl sulfonates, alpha olefin sulfonates, alkyl sulfates, and secondary alkane sulfonates, b) at least one poly[oxyalkylene] ammonium cationic surfactant, and c) an alkaline agent.

The acidic presoak or prescrub liquid would comprise a solution at a pH of between 1.0 and 5.5, or between 1.5 and 5, or between 2.0 and 5.0 comprising an acid (such as phosphoric acid, oxalic acid, tartaric acid, acetic acid, formic acid, trichloroacetic acid, glycolic acid, chloracetic acid, bromacetic acid, cyanoacetic acid, thioacetic acid, propanoic acid, barbituric acid, succinic acid, butanoic acid, uric acid, itaconic acid, 2-oxoglutaric acid, pentanoic acid, picric acid, picolinic acid, citric acid, isocitric acid, carboxyglutamic acid, 2-oxo-3-methylpentanoic acid, adipamic acid, adipic acid, hexanoic acid, 2-bromobenzoic acid, benzoic acid, 3-chlorobenzoic acid, 2-iodobenzoic acid, dinicotinic acid, dipicolinic acid, lutidinic acid, 2 or 3-nitrobenzoic acid, quinolinic acid, gallic acid and the like), inorganic acids such as phosphoric or phosphorous acid and at least one surfactant. The combination of phosphoric acid with organic acids, particularly the combination of phosphoric acid and oxalic acid (for example) provides greatly enhanced aluminum brightening along with the highly effective soil removing/cleaning effects of the compositions of the present invention. The ratio of the phosphoric acid and other organic acid preferably should be in the range of 1:15 to 15:1, weight/weight. The pH of the acidic solution on the surface should be within the described pH range. When the next liquid is applied, that next liquid will raise the pH level of the liquid on the surface of the vehicle. There will be a dwell time of the various liquids on the surface, with a alkaline liquid being applied to the vehicle surface during at least a part of the dwell time of a previously applied acidic liquid. By partial dwell time it is meant that some of the previously applied liquid may have run off the surface, dripped off the surface or evaporated, but that there is still visible liquid on the surface of the vehicle from that previous liquid application, either as a film, droplets, beads, patches, or the like. The application of an alkaline wash solution, including the alkaline wash solutions of the invention which comprise the at least one poly[oxyalkylene] ammonium cationic surfactant, will cause the pH of the liquid dwelling on the surface of the vehicle to rise to above pH 7, as the pH of the alkaline liquid will decrease, although remaining at a level above about 8.5 as described above. The pH may be measured by any convenient method, including, but not limited to the presence of a pH indicator strip on the surface of the vehicle, the use of pH measuring electrodes attached to the surface (for testing purposes), the placement of pH measuring devices onto the surface, and/or the removal of liquid samples from the surface and the measuring of the pH by conventional pH measuring devices and systems. The benefits of this aspect of the invention result with this acid first liquid application followed by a basic second liquid application, and, in fact, may be used in combination with any sequence of acid then alkaline material or alkaline material then acid, as well as with any other features, compositions or practices described herein. Where terms such as first liquid or second liquid are used, the numeric references imply order only when so specifically identified. In the practice of the application of the terminology "acid first liquid application followed by a basic second liquid application," the term "follows" clearly identifies a required order or sequencing of the steps. Without such limitation, the reference to a number for the steps herein includes both the specific stated ordering and any reordering (e.g., applying a second liquid first) within the scope of the language.

The pH change in the later applied alkaline solution tends to be particularly important where a first later applied solution or a second later applied solution (later with respect to the first in sequence applied acidic liquid) contains a chelating agent, particularly the chelating agents according to the practice of the present invention such as the aminopolycarboxylic chelating agents such as HEDTA and EDTA and DTPA. The use of the lower pH (acidic) earlier applied liquid in combination with the later applied basic chelating agent containing liquids has been found to provide uniquely effective cleaning for a wide variety of components in road soil, and a high degree of cleaning and brightness to the cleaned surface.

One type of preferred cleaning or wash liquid in the practice of the present invention would comprise an anionic surfactant (particularly those from the class comprising at least one anionic surfactant selected from the group consisting of linear alkyl benzyl sulfonates, alpha olefin sulfonates, and secondary alkane sulfonates), at least one cationic surfactant comprising at least one poly[oxyalkylene] ammonium cationic surfactant, at least one non-ionic surfactant (as defined and described above), at least one alkaline agent (as described above), an aliphatic or aromatic or mixed aliphatic-aromatic hydrocarbon, oil or spirit (e.g., mineral oil, mineral spirit, terpene, limonene oxide, limene, terpentine, and the like), hydrotrope (e.g., dispersing or emulsifying agents, coupling agents, amphoteric agents, compounds having a hydrophilic-htdrophobic balance within the range of 2–16, oxygenated solvents such as the Dowanol™ series and the like), and the various other types of general ingredients described herein and in the art in general. Such general ingredients might include, for example, thickening agents, antioxidants, dyes, organic solvents, silicates, and the like.

EXAMPLES

T-1 An Alkaline Builder Concentrate Containing Aminocarboxylic Acid Chelating Agent. This Product is Often Applied with T-2.

Formula Breakdown for: Formula T-1

| Percent | Raw Material |
|---|---|
| 85.05000 | TETRASODIUM EDTA LIQ. 40% |
| 2.70000 | SODIUM HYDROXIDE 50% LIQUID |
| 9.25000 | SODIUM SILICATE SOLUTION, 2.40 $SiO_2/Na_2O$ |
| 3.00000 | AMINOTRIS(METHYLENE PHOSPHONIC ACID) 50% |
| Total 100.00% | |

T-2 Formula Surfactant Concentrate Containing Poly[oxyalkylene]ammonium Cationic Surfactant. This Product is Often Applied with T-1.

Formula Breakdown for: T-2

| Percent | Raw Material |
|---|---|
| 13.45 | WATER, ZEOLITE SOFTENED |
| 3.85 | POTASSIUM HYDROXIDE, 45% LIQUID |
| 16.50 | SODIUM XYLENE SULFONATE, 40% |
| 9.45 | LINEAR DODECYL BENZENE SULFONIC ACID 97% |
| 9.00 | Fatty Alcohol ($C_{12}$–$C_{14}$) ethoxylate propoxylate Dehypon ™ LS-54 |
| 7.75 | LINEAR ALCOHOL 60–70% ETHOXYLATE; Neodol 25-7 |
| 31.50 | Lauryl Dimethylamine Oxide, (30%) |
| 9.0 | Poly[oxyalkylene]ammonium Cationic Surfactant |
| 4.50 | MINERAL SPIRITS |
| 5.00 | Dipropylene Glycol Methyl Ether, bulk |
| Total 100.00% | |

T-3 Acid Detergent Applied As a Separate Solution, E.G., Before or After Either or Both of the T-1 or T-2 Applications.

Formula Breakdown for: T-3

| Percent | Raw Material |
|---|---|
| 10.00000 | WATER, ZEOLITE SOFTENED |
| 44.50000 | CITRIC ACID, 50%, |
| 20.50000 | LINEAR DODECYL BENZENE SULFONIC ACID 97% |
| 7.50000 | Sodium Lauryl Ether Sulfate 60%, |
| 5.00000 | NONYLPHENOL ETHOXYLATE 9.5 MOLE |
| 1.00000 | POLYOXYETHYLENE POLYOXYPROPYLENE DERIV.; |
| 11.50000 | Dipropylene Glycol Methyl Ether, bulk |
| Total 100.00% | |

T-4 DETERGENT Acidic Detergent Containing Poly[oxyalkylene] Ammonium Cationic Surfactant that may be Used without Either T-1 or T-2 Application.

Formula Breakdown for: T-4 Detergent

| Percent | Raw Material |
|---|---|
| 10.00000 | WATER, ZEOLITE SOFTENED |
| 41.00000 | CITRIC ACID, 50%, |
| 7.00000 | Sodium Lauryl Ether Sulfate 60% |
| 20.50000 | LINEAR DODECYL BENZENE SULFONIC ACID 97% |
| 5.00000 | NONYLPHENOL ETHOXYLATE 9.5 MOLE |
| 5.00000 | Poly[oxyalkylene] Ammonium Cationic Surfactant |
| 11.50000 | Dipropylene Glycol Methyl Ether, bulk |
| Total 100.00% | |

Evaluate Glensurf 42

The purpose of the test is to evaluate Glensurf 42 in a plastic and multi-substrate rinse aid test. Test Conditions: The test substrates were Presoiled with 14 grams of hot point soil in the Hobart WM-5 for 3 min. in 160° F. city water. Then transferring the test substrates to the Champion 1 KAB for testing in city water 140° F. A 30 second wash with no rinse water, observations were recorded for each additional PPM.

| PPM | Observation |
|---|---|
| 5 PPM | Water seems to collect together then run down or off the test substrate. |
| 10 PPM | No visible change. 10 seconds for the water to collect together and run off. |
| 20 PPM | No visible change. |
| 40 PPM | Very little change, the water seems to shed off slower on the car painted plates and bike chain guard part. Film and steam is beginning to stay on the window from the bottom going up. |
| 80 PPM | Water is cloudy but does clear with time. No foam. |
| 100 PPM | A slight dull appearance on the metal plate. The shedding of the water has slowed down. |
| 140 PPM | Film has covered 95% of the window. Some surface foam. No visible change on the substrate. |
| 200 PPM | Shedding of the water has slowed. It appears to have less water spots or droplets on the surface of the substrate. The surface of the substrate are dry to the touch. The metal plate appears to have a slightly duller finish. Slightly more foam. |

-continued

| PPM | Observation |
|---|---|
| 500 PPM | Shedding of the water has slowed down to 18 seconds, just leaving water droplet on substrates. Residue is noticeable on the metal non-painted surface, the surface has a dull appearance. Stable foam is ~ 2.5 inches and take 2 mins. for the foam to break up.<br>The window fogs and films from the down ~ ¼ of the window.<br>The window has a slight residue appearance and is dry to the touch. |
| 1000 PPM | Pinhole developed on the China plate. Shedding time on the non-painted metal plate 40 seconds, clear glass 30 seconds, china plate 30 seconds. On the window surface, the water runs rapidly down forming legs and making a honey cone pattern with film in the center of the cone. The foam is very stable ~ 3.4 inches and take 3 min to break-up. |
| 1500 PPM | The foam is very stable 5–6 inches breaks down rapidly to ¾ inches but stays stable for another 6–7 mins.<br>Foam remains on the surface of the substrates, pinhole effects on all of the substrates. Shedding of the water on the china plate took 30 seconds, on the metal 45 seconds. |

Evaluate Witco Emcol CC - 9

| PPM | Observation |
|---|---|
| 5 PPM | No visible change. Water droplets remain on all substrates. |
| 10 PPM | Knife and glass appears to shed the water the fastest. |
| 20 PPM | The china plate stays totally wet for 18 sec. Then the water runs off. Rapid water removal on knife, glass, polycaronate, and spoon. Water droplet left on substrates. Water is clear. |
| 40 PPM | Water runs down on all substrates. The china plate remains wet before water sheds. |
| 80 PPM | No visible change. |
| 100 PPM | No visible change. |
| 140 PPM | No visible change on the substrates. The water is slightly hazy, no foam. |
| 200 PPM | Water droplets remain on all substrates. Water removes or sheds fast on all substrates except for the china plate. It takes about 18 sec before the water sheds from the plate. Trace of foam. |
| 500 PPM | No visible change. |
| 1000 PPM | No visible change. No foam or scum, water has a hazy appearance. |

Evaluate Witco Emcol CC - 42

| PPM | Observation |
|---|---|
| 5 PPM | No visible change. Water run off, droplets remain on all substrates. |
| 10 PPM | No visible change. Water run off, droplets remain on all substrates. |
| 20 PPM | No change. |
| 40 PPM | The water sheets off the substrates. |
| 60 PPM | The window is fogging up. |
| 100 PPM | The window totally fogged up. On the window, the water beads up plus streams of water runs down. No visible change on substrates. |
| 200 PPM | Unstable foam ~ ¼". The window fogs from the top down. There might be a trace of surface scum. Scum also noticed on the back wall of the machine. |
| 300 PPM | Stable foam 1". |
| 400 PPM | The surface of the substrates appears to have pinholes. The clear substrates such as the glass have a hazy look to them. |

-continued

Evaluate Witco Emcol CC - 42

| PPM | Observation |
|---|---|
| 500 PPM | Foam is 3", little foam bubble area staying on the surface of the substrate. |
| 1000 PPM | 5–6" very stable foam. The foam stays on the surface of the substrates. |

Evaluate Witco Emcol CC - 55
Date of test Jan. 7, 1998

| PPM | Observation |
|---|---|
| 1 PPM | No visible change. Water run off, droplets remain on all substrates. |
| 3 PPM | No visible change. Water run off, droplets remain on all substrates. |
| 5 PPM | Possibility of some pinhole effect on the china plate and plastic plate. Good water run off on all substrates. |
| 20 PPM | Good runoff of the water. No foam. Within 4 min. the substrates are ~ 95% dry. |
| 100 PPM | No visible change. |
| 200 PPM | Knife and glass starting to have a pinhole effect. The water is milky. |
| 300 PPM | No visible change. Scum was also detected on the back wall on the machine. |
| 400 PPM | No foam. The rack appears to have a white scale deposit on it. |
| 500 PPM | 3" of foam. |
| 700 PPM | 3–4" of foam. |
| 1000 PPM | 5–6" of foam. Good run of water, some pinhole effect on the plates. |

Evaluate Witco Emcol CC - 59
Date of test Jan. 7, 1998

| PPM | Observation |
|---|---|
| 5 PPM | Water sheets rapidly leaving small water droplets on the surface. |
| 10 PPM | No visible change. |
| 15 PPM | Very small amount of surface foam. Water runs very rapidly off the substrates, leaving water droplets. The substrates look ~ 95% dry in 2.25 mins. They feel dry to the touch. |
| 20 PPM | Half of the window fogs. No visible change on the substrate. |
| 100 PPM | The window fogs from the top down and has droplet and water streams. Stable foam of 1.5". |
| 200 PPM | Foam droplets or bubbles remain on the surface of the substrates. Foam level is 3". Water sheets rapidly. It took 1.5 mins drying time to reach the ~ 95% dry surface. |
| 300 PPM | 5–6 inches of foam. Signs of film on the substrates. |
| 500 PPM | 6 inches of foam. Test was aborted at this point. While cleaning the machine a yellowish grease scum was detected on the back wall of the machine. |

USE SOLUTION pH STUDY

| Date | Weather | Equipment Type | Volume T-3 Product | Titration T-3 Product | Volume T-1 Product | Volume T-2 Product | Titration T-1/T-2 Product | pH of Solutions on Vehicle | Number of Vehicles | Results |
|---|---|---|---|---|---|---|---|---|---|---|
| Feb. 17 | Cloudy, 29 deg F. | In-Bay Auto | 36 ml | 5 ml, 7 drops | 63 ml | 38 ml | 5 ml, 11 drops | — | 3 | Film |
| Feb. 17 | Cloudy 29 deg F. | In-Bay Auto | 38 ml | 5 ml, 8 drops | 48 ml | 38 ml | 5 ml, 8 drops | — | 5 | No Film |
| Feb. 17 | Cloudy 29 deg F. | In-Bay Auto | 38 ml | 5 ml, 8 drops | 23 ml | 38 ml | 5 ml, 4 drops | — | 3 | Film |
| Feb. 17 | Cloudy 29 deg F. | In-Bay Auto | 38 ml | 5 ml, 8 drops | 33 ml | 38 ml | 5 ml, 6 drops | — | 4 | No Film |
| Feb. 17 | Cloudy 29 deg F. | In-Bay Auto | 38 ml | 5 ml, 8 drops | 39 ml | 38 ml | 5 ml, 7 drops | — | 5 | No Film |
| Feb. 18 | Sunny, 23 deg F. | In-Bay Auto | 50 ml | — | 50 ml | 35 ml | — | — | 4 | No Film |
| Feb. 18 | Sunny, 23 deg F. | In-Bay Auto | 34 ml | — | 25 ml | 40 ml | — | — | 3 | Film |
| Feb. 18 | Sunny, 23 deg F. | In-Bay Auto | 25 ml | 5 ml, 5 drops | 30 ml | 28 ml | 5 ml, 6 drops | 9.5 | 14 | No Film |
| Feb. 22 | Cloudy 24 deg F. | Touchless Tunnel | 10 ml | 25 ml, 6 drops | 33 ml | 39 ml | — | 9 | 4 | No Film |
| Feb. 22 | Cloudy 24 deg F. | Touchless Tunnel | 10 ml | 25 ml, 6 drops | 78 ml | 39 ml | — | 11.5 | 4 | Film |
| Feb. 22 | Cloudy 24 deg F. | Touchless Tunnel | 10 ml | 25 ml, 6 drops | 61 ml | 39 ml | 5 ml, 25 drops | 10 | 10 | No Film |
| Feb. 22 | Cloudy 24 deg F. | Touchless Tunnel | 10 ml | 25 ml, 6 drops | 32 ml | 30 ml | — | 9 | 12 | No Film |
| Feb. 22 | Cloudy 24 deg F. | Touchless Tunnel | 60 ml | 25 ml, 60 drops | 32 ml | 30 ml | — | 7 | 4 | Film |
| Feb. 23 | Sunny, 25 deg F. | Hybrid | 10 ml | — | 24 ml | 25 ml | — | 9.8 | 4.5 | No Film |
| Mar. 22 | Sunny, 41 deg F. | In-Bay Auto | 0 | None | 50 ml | 20 ml | 10 ml, 20 drops | 10 | 16 | No Film |

PERFORMANCE CHARACTERISTICS OF POLY[OXYALKYLENE] AMMONIUM CATIONIC SURFACTANT IN t-2 SURFACTANT CONCENTRATE

| Date | Weather | Equipment Type | mls T-1 Product On Car | mls T-2 product On Car | Percent Poly[oxyalkylene] Ammonium Cationic Surfactant in T-2 Product | Clean | Dry | Shine |
|---|---|---|---|---|---|---|---|---|
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | +− | −+ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | −+ | −+ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | −++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0 | +−− | −+ | −− |
| Mar. 25 | Sunny 43 deg F. | In-Bay Auto | 50 | 22 | 0 | +++ | ++ | −− |
| Mar. 25 | Sunny 43 deg F. | In-Bay Auto | 50 | 22 | 0 | +−− | −− | −− |
| Mar. 25 | Sunny 43 deg F. | In-Bay Auto | 50 | 22 | 0 | +++ | ++ | ++ |
| Mar. 25 | Sunny 43 deg F. | In-Bay Auto | 50 | 22 | 0 | +++ | −− | −− |
| Mar. 25 | Sunny 43 deg F. | In-Bay Auto | 50 | 22 | 0 | +−− | +− | −− |
| Mar. 25 | Sunny 43 deg F. | In-Bay Auto | 50 | 22 | 0 | −−− | −− | −− |
| Mar. 25 | Sunny 43 deg F. | In-Bay Auto | 50 | 22 | 0 | −−+ | +− | −− |
| Mar. 25 | Sunny 43 deg F. | In-Bay Auto | 50 | 22 | 0 | −−− | −− | −− |
| Mar. 25 | Sunny 43 deg F. | In-Bay Auto | 50 | 22 | 0 | +−− | ++ | −− |
| Mar. 25 | Sunny 43 deg F. | In-Bay Auto | 50 | 22 | 0.5 | −++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | −+ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| Mar. 25 | Sunny 43 deg F. | In-Bay Auto | 50 | 22 | 0.5 | +++ | ++ | ++ |
| | | | | | | +Glass +Chrome +Paint | +Hood +Sides | +Paint +Chrome |

The Addition of Non-Ionic Surfactants to the Compositions

As noted above, the addition of non-ionic surfactants, such as the Videt RFG and the Dehypon™ LS-54 provide desirable benefits, as does the unique combination of phosphoric acid and an organic acid, such as oxalic acid, provide additional unique benefits to the practice of the present invention. Another specific formulation within the scope of the present invention that further exemplifies these benefits includes:

| PERCENT BY WEIGHT | RAW MATERIAL |
|---|---|
| 55.25 | Soft Water |
| 10.00 | Phosphoric acid (75% aqueous) |
| 3.50 | Oxalic Acid dihydrate 99% |

-continued

| PERCENT BY WEIGHT | RAW MATERIAL |
|---|---|
| 6.00 | Videt RFG Non-ionic Surfactant |
| 6.00 | Linear Dodecyl Benzene Sulfonic Acid 97% |
| 2.50 | Nonylphenol Ethoxylate 9.5 Mole |
| 7.50 | Dehypon ™ LS-54 non-ionic surfactant |
| 1.25 | GlenSurf ™ 42 cationic surfactant |
| 6.00 | Propylene Glycol Monomethyl Ether |
| 2.00 | Aliphatic Hydrocarbon |
| 100% | TOTAL |

This composition has found particular utility for touchless and friction-type car and truck washes, wheel cleaning and brightening processes in car washes. Carbon soil film removal in truck washing, rust stain removal in truck washing.

The function of the oxalic acid (as an example of the organic acid) and the phosphoric acid (as an example of the inorganic acid) have been noted as follows:

| | |
|---|---|
| 1) Phosphoric acid alone - | No aluminum brightening |
| 2) Oxalic acid alone - | Some aluminum brightening seen |
| 3) Citric and Oxalic acid - | Some aluminum brightening seen |
| 4) Citric acid alone - | No aluminum brightening seen |
| 5) Phoshoric acid/oxalic acid - | Best level of aluminum brightening seen. |

What is claimed:

1. An aqueous solution at a pH between 1.0 and 13 comprising:
   a) at least one anionic surfactant,
   b) at least one propoxylated ammonium cationic surfactant of the formula

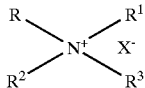

wherein R, $R^1$, and $R^2$ are independently selected from lower alkyl groups, $R^3$ comprises a polyoxypropylene chain of a general formula selected from the group consisting of:

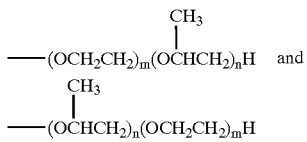

and wherein n is from 1 to 60, m is from 0 to 30, and m+n is between 1 and 60, and X comprises an anion, and
   (c) at least one material comprising at least one of an alkaline agent and an acidulating agent.

2. The aqueous solution according to claim 1, wherein the at least one anionic surfactant comprises at least one of linear alkyl benzyl sulfonates, alpha olefin sulfonates, alkyl sulfates, secondary alkane sulfonates, and mixtures thereof.

3. The aqueous solution according to claim 1, further comprising:
   (a) at least one polycarboxylic acid chelating agent.

4. The aqueous solution according to claim 1, further comprising:
   (a) at least one amine containing carboxylic acid chelating agent.

5. The aqueous solution according to claim 1, further comprising:
   (a) at least one amine containing acetic acid chelating agent.

6. The aqueous solution according to claim 1, further comprising at least one additional additive that comprises at least one of a polycarboxylic acid chelating agent, a non-ionic surfactant, amphoteric surfactant, silicate, and mixtures thereof.

7. The aqueous solution according to claim 1, further comprising at least one chelating agent for multivalent metal cations that is present from about $2 \times 10^{-3}\%$ to 50% by weight.

8. The aqueous solution according to claim 1, wherein
   (a) the at least one anionic surfactant is present from about $1 \times 10^{-2}\%$ to 25% by weight and
   (b) the propoxylated ammonium cationic surfactant is present from about $1 \times 10^{-2}\%$ to 8% by weight.

9. The aqueous solution according to claim 1, wherein the at least one material comprises an alkaline agent present from about 0.25% to 12% by weight.

10. A process for cleaning a surface comprising applying an aqueous solution to the surface, wherein the aqueous solution has a pH between 1.0 and 13 and comprises:
    (a) at least one anionic surfactant,
    (b) at least one propoxylated ammonium cationic surfactant of the formula

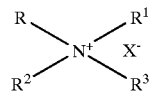

wherein R, $R^1$, and $R^2$ are independently selected from lower alkyl groups, $R^3$ comprises a polyoxypropylene chain of a general formula selected from the group consisting of:

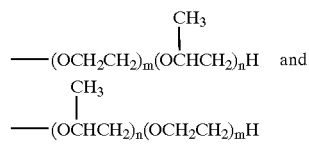

wherein n is from 1 to 60, m is from 0 to 30, and m+n is between 1 and 60, and X comprises an anion, and
    (c) at least one material comprises at least one of an alkaline agent and an acidulating agent.

11. A process for cleaning according to claim 10, wherein the surface is part of a vehicle.

12. A process for cleaning according to claim 10, wherein the surface is a wheel of a vehicle.

13. A process for cleaning according to claim 10, further comprising applying an acidic presoak solution to the surface.

14. A process for cleaning according to claim 13, wherein the acidic presoak solution has a pH between 1.0 and 5.5 and comprises:
    an acid,
    inorganic acid, and
    at least one surfactant.

15. A process for cleaning according to claim 10, wherein the surface is within a clean-in-place system.

16. A process for cleaning according to claim 10, wherein the applying step is done with a water jet spray apparatus.

17. A process for cleaning an exterior surface of a vehicle comprising applying an aqueous solution to the exterior surface of the vehicle to be cleaned, wherein the solution has a pH of between 1.0 and 13 and comprises:
(a) at least one anionic surfactant,
(b) at least one propoxylated ammonium cationic surfactant, and
(c) at least one of an alkaline agent and an acidulating agent.

18. A process for cleaning according to claim 17, further comprising at least one additional additive that comprises at least one of a polycarboxylic acid chelating agent, a nonionic surfactant, amphoteric surfactant, silicate, and mixtures thereof.

19. A process for cleaning according to claim 17, wherein the propoxylated ammonium cationic surfactant comprises a surfactant having the formula:

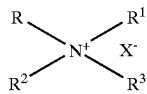

wherein R, $R^1$, and $R^2$ are independently selected from lower alkyl groups, $R^3$ comprises a polyoxypropylene chain, and X comprises an anion.

20. A process for cleaning an exterior surface of a vehicle according to claim 19, wherein the polyoxypropylene chain comprises at least one of:

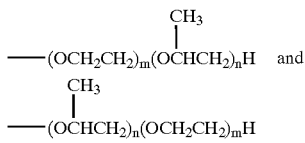

wherein m is from 0 to 30, and n is from 1 to 60.

21. A process for cleaning according to claim 17, wherein the at least one anionic surfactant comprises at least one of linear alkyl benzyl sulfonates, alpha olefin sulfonates, alkyl sulfates, secondary alkane sulfonates, and mixtures thereof.

22. A process for cleaning an exterior surface of a vehicle comprising applying an aqueous solution to the exterior surface of the vehicle to be cleaned, wherein the solution has pH of between 1.0 and 13 and comprises:

(a) at least one propoxylated ammonium cationic surfactant, and
(b) at least one of an alkaline agent and an acidulating agent.

23. A process for cleaning an exterior surface of a vehicle according to claim 22, wherein the propoxylated ammonium cationic surfactant comprises a surfactant having the formula:

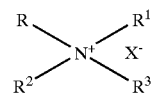

wherein R, $R^1$, and $R^2$ are independently selected from lower alkyl groups, $R^2$ comprises a polyoxypropylene chain, and X comprises an anion.

24. A process for cleaning an exterior surface of a vehicle according to claim 23, wherein the polyoxypropylene chain comprises at least one of:

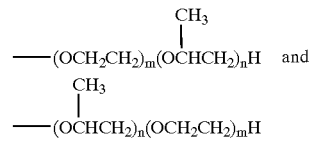

wherein m is from 0 to 30, and n is from 1 to 60.

25. A process for cleaning an exterior surface of a vehicle according to claim 22, wherein the solution further comprises at least one polycarboxylic acid chelating agent.

26. A process for cleaning an exterior surface of a vehicle according to claim 22, wherein the solution further comprises at least one amine containing carboxylic acid chelating agent.

27. A process for cleaning an exterior surface of a vehicle according to claim 22, wherein the solution further comprises at least one additional additive comprising at least one of a polycarboxylic acid chelating agent, a nonionic surfactant, amphoteric surfactant, silicate, and mixtures thereof.

* * * * *